Patented May 22, 1951

2,553,982

UNITED STATES PATENT OFFICE 2,553,982

METHOD OF POLYMERIZING PHENOL-CONTAINING VINYLIDENE CHLORIDE

Theodore W. Sarge, Midland, Mich., assignor to The Dow Chemical Company, Midland, Mich., a corporation of Delaware No Drawing. Application March 7, 1949, Serial No. 80,105

7 Claims. (Cl. 260—91.7)

This invention relates to a method for effecting the polymerization of vinylidene chloride, or of monomeric mixtures containing it, which contain enough of a phenolic compound to prevent polymerization under normal storage conditions.

It is recognized that monomeric forms of readily polymerizable compounds must be treated with a polymerization inhibitor if such monomers are to be stored for any length of time between their initial preparation and the intended time for polymerization. This is illustrated, in the case of vinylidene chloride, by the teachings of Coleman and Zemba, in U. S. Patent No. 2,136,333. That patent shows the effectiveness of phenolic compounds as polymerization inhibitors for monomeric vinylidene chloride. Such phenolic compounds as phenol and tertiary-butyl catechol are commonly used to inhibit polymerization of monomeric forms of such readily polymerizable compounds as vinylidene chloride, styrene, butadiene, and vinyl chloride. Before such a phenol-containing monomer is polymerized, it has been deemed necessary to remove the phenol or to employ so much polymerization catalyst that the small amount of phenol present no longer is able to prevent polymerization.

The usual method of freeing a phenol-containing monomer from the inhibiting effects of the phenolic compound consists in fractionally distilling the monomer, which is usually low boiling, from the phenol, which has a relatively high boiling point. This is the method suggested and practiced by Coleman and Zemba in the runs reported in Patent 2,136,333. One problem attendant on this method arises from the fact that the first monomer distilled actually starts to polymerize before all of the monomer has been so-treated, and the polymer product is less uniform than desired owing to the different lengths of time during which various parts of the batch have been polymerizing.

The method of overcoming the inhibiting effect of the phenolic compound by employing very active and often very complex catalyst mixtures is illustrated by R. M. Wiley, in U. S. Patent No. 2,160,935. That patent shows, for example, that a monomeric vinylidene chloride-styrene mixture, containing an inhibiting amount of phenol, can be made to polymerize by adding 1.5 per cent of a catalyst mixture containing equal amounts of benzoyl peroxide, tetraethyl lead and chloroacetyl chloride. None of these agents alone is deemed sufficiently active to accomplish the desired result. The use of such a mixture leaves in the polymer a complex catalyst residue which not only discolors the polymer but also appears to catalyze the decomposition of the polymer when the latter is heated during molding or extrusion operations.

To overcome the aforementioned and related difficulties, it would be desirable, and it is an object of this invention, to provide a method whereby the inhibiting effects of the phenolic compound may be overcome in a monomer containing a phenol, and whereby the undesirable effects of discoloring or destructive residues may be avoided in the resultant polymer. A related object is to provide such a method in which it is unnecessary to separate the monomer from the phenolic inhibitor by distillation in order to obtain a uniform polymer product free from destructive and discoloring impurities. Another object is to provide a method for polymerizing vinylidene chloride which has been treated with a phenolic compound to prevent polymerization, without physical separation of the phenol from the monomer, and at a polymerization rate comparable with that normally obtained when using uninhibited monomer, to produce a high quality product. Other and related objects may appear hereinafter.

I have now found that the monomer of vinylidene chloride, or mixtures of monomers containing preponderant amounts of vinylidene chloride, which have been inhibited against polymerization by the addition of a phenolic compound, can be made to polymerize readily and at a satisfactorily rapid and steady rate, by mixing with the phenol-containing monomer a small amount, usually from 0.5 to 15 per cent, by weight, of acetyl chloride or acetic anhydride and, optionally, a catalytic amount of concentrated sulfuric acid, and polymerizing the monomeric material either en masse or in aqueous suspension or in aqueous emulsion. The amount of anhydride or acid chloride employed should be at least equivalent to the amount of phenolic inhibitor present, but considerably larger amounts do not interfere with the process. The polymer produced is free from discoloration and, because of the steady rate at which it is produced, it is more uniform than that formed from a similar monomer which is freed from phenol by distillation. When polymerization is effected en masse, the aryl acetate does not discolor the polymer or interfere with subsequent heat-fabrication operations. When the polymer is made in aqueous suspension, or in emulsion, the aryl acetate is extracted from the polymer by the aqueous phase, and in either case there are no harmful residues in the polymer. If desired, small amounts of benzoyl peroxide may be added during polymerization, insufficient in themselves to overcome the inhibiting effect of the phenolic compound, but sufficient to accelerate the polymerization of the monomer after the phenolic compound has been converted to the corresponding acetate. Regardless of whether a peroxide catalyst is employed, the use of acetyl chloride or acetic anhydride materially shortens the polymerization induction time of the monomer. This effect is so appreciable that a mixture of phenol-inhibited monomer and acetic anhydride polymerizes sooner and more rapidly than does a freshly distilled pure monomer of vinylidene chloride. To obtain maximum advantage from this phenomenon, the phenol-containing monomer which has been treated with acetyl chloride or with acetic anhydride should be kept anhydrous for a period of about an hour and then, if desired, it may be suspended or emulsified in water for the balance of the polymerization period.

It has been found that the results obtained with acetic anhydride or acetyl chloride are unique, in that other anhydrides and acid chlorides, capable of esterifying phenols, are not effective for the present purpose. Thus benzoyl chloride, adipyl chloride, maleic anhydride, and phthalic anhydride all fail to product the results which are obtained with the preferred reagents, or they exhibit a very low order of assistance. Similarly, phosphorus trichloride, pentachloride and oxychloride, each of which can esterify phenols, are without apparent utility here.

In the preliminary tests, to determine whether a particular treatment had removed the phenol from, or counteracted its inhibiting influence in monomeric vinylidene chloride, a sample of the treated monomer was held at constant temperature in the field of vision of a turbidimeter. A reduction in the ability of the test monomer to transmit light has been found to be indicative of the occurrence of polymerization, and the time required for this condition to appear in a sample of monomeric vinylidene chloride after the treatment to deactivate the phenol is taken as the polymerization induction period. The shorter this period can be made, the more effective is the treatment in accomplishing the desired result. Some of the preliminary results, each indicating solely the effect of a single identified treatment, are given in the following Table 1, which lists the polymerization induction time of monomeric vinylidene chloride at 50° C. The original monomer contained 1 per cent of phenol as a polymerization inhibitor. One drop of sulfuric acid was added to each fluid ounce of monomer tested.

*Table 1*

| Added Agent | | | Polymerization Induction Time | Polymer |
| --- | --- | --- | --- | --- |
| Kind | Amount | | | |
| | Volume Per Cent | Weight Per Cent | | |
| None | | | Indefinite; at least several days | None. |
| Monomer washed with dilute sodium hydroxide | | | 60 minutes | Yellow-white solid. |
| Acetic anhydride | 4 | | 13 minutes | Pure white solid. |
| Do | 12 | | 8 minutes | Do. |
| Do | 20 | | 5 minutes | Do. |
| Maleic anhydride | | 4 | Over 60 minutes | Red-orange liquid. |
| Acetyl chloride | 4 | | 30 minutes | Pure white solid. |
| Do | 12 | | 10 minutes | Do. |
| Do | 20 | | 8 minutes | Do. |
| Adipyl chloride | 20 | | 28 minutes | Pink liquid. |
| Benzoyl chloride | 20 | | Over 30 minutes | Do. |
| Benzoyl peroxide | | 1 | No change in 168 hours | None. |

When it was attempted to carry the advantages of the process into the production of polymeric vinylidene chloride in aqueous suspension or in aqueous emulsion, it was found that there must be a sufficient period of contact between the dry, phenol-containing monomer and the acetyl chloride or acetic anhydride to allow the so-modified monomer to pass through its shortened polymerization induction period before it is dispersed in water. Table 2 illustrates the practice of the invention applied to polymerization of phenol-inhibited vinylidene chloride monomer in aqueous suspension at 50° C., using acetic anhydride as the treating agent.

*Table 2*

| Acetic anhydride, Wt. per cent of Monomer | Benzoyl peroxide, Wt. per cent of Monomer | Water, Weight per cent of Monomer | Polymerization Time, Hours | | Polymerization, rate, per cent per hour |
| --- | --- | --- | --- | --- | --- |
| | | | Anhydrous | In Water | |
| None | 1 | 100 | 0 | 23 | No polymer |
| 1.35 | 0 | 100 | 0 | 16 | No polymer |
| 1.35 | 0 | 100 | 1 | 22 | 0.45 |
| 1.35 | 0.1 | 100 | 1 | 21 | 2.2 |
| 1.35 | 0.2 | 100 | 1 | 21 | 3.2 |
| 1.35 | 0.3 | 100 | 1 | 21 | 3.5 |
| 1.35 | 0.4 | 100 | 1 | 21 | 3.5 |
| 1.35 | 0.5 | 100 | 1 | 21 | 3.6 |
| [1] 1.35 | 0 | 100 | 1 | 22 | 0.5 |
| [1] None | 0.1 | 100 | 0 | 22 | 2.6 |
| [1] None | 0.2 | 100 | 0 | 22 | 3.4 |
| [1] None | 0.3 | 100 | 0 | 22 | 3.6 |
| [1] None | 0.4 | 100 | 0 | 22 | 4.1 |

[1] NOTE: The last five runs were made on freshly distilled, uninhibited monomeric vinylidene chloride.

It is apparent from these and other similar data that a phenol inhibited vinylidene chloride monomer can be made to polymerize at essentially the same rate as an uninhibited sample, by the addition of small amounts of acetic anhydride or acetyl chloride and that, after the induction period for a so-treated monomer (less than an hour) has passed, the polymerization can be carried out smoothly in aqueous suspension or in aqueous emulsion. It is seen that the use of benzoyl peroxide, or similar agents, is not necessary but that it speeds up the polymerization. Where freedom from peroxides is required in the polymer, they may be omitted. It is also noted from the tables that benzoyl peroxide alone cannot overcome the inhibiting effect of a phenol as can either acetic anhydride or acetyl chloride when these are used alone, preferably in the presence of small amounts of sulfuric acid.

The polymer product obtained from the present process is more easily plasticized than is a polymer or copolymer of similar analysis made from uninhibited monomers. It is also more easily extruded than such a polymer, without further plasticization. It is inferred that this may be due to the small amount (usually less than 2 per cent) of an aryl acetate which is formed in the process and which may become absorbed in the polymer.

The invention has been illustrated with reference to monomeric vinylidene chloride which has been polymerized to form the homopolymer. It is equally applicable to the similarly advantageous treatment of mixtures of monomers including phenol-inhibited vinylidene chloride, from which copolymers are obtained.

The examples have shown the polymerization of phenol-inhibited monomer in the presence of acetic anhydride or acetyl chloride, with or without added minor amounts of sulfuric acid and with or without added minor amounts, up to about 1 per cent, of a peroxidic catalyst, and at customary polymerization temperatures up to 50° C. Other conventional temperatures can be used, and the reaction can be carried out at room temperature with the assistance of light as a promoter of polymerization instead of the benzoyl or other peroxides previously suggested.

I claim:

1. The method of polymerizing monomeric vinylidene chloride containing polymerization inhibiting amounts of a phenol which consists essentially in mixing with such monomer a compound from the class consisting of acetic anhydride and acetyl chloride, in amount at least equivalent to the phenol present, and subjecting the mixture to temperature conditions known to induce polymerization of the uninhibited monomer, keeping the said mixture anhydrous at least until polymerization has started.

2. The method of polymerizing monomeric vinylidene chloride containing polymerization inhibiting amounts of a phenol which consists essentially in mixing acetic anhydride with such monomer in amount at least equivalent to the phenol present, and subjecting the mixture to temperature conditions known to induce polymerization of the uninhibited monomer, keeping the said mixture anhydrous at least until polymerization has started.

3. The method of polymerizing monomeric vinylidene chloride containing polymerization inhibiting amounts of a phenol which consists essentially in mixing acetyl chloride with such monomer in amount at least equivalent to the phenol present, and subjecting the mixture to temperature conditions known to induce polymerization of the uninhibited monomer, keeping the said mixture anhydrous at least until polymerization has started.

4. The method of polymerizing monomeric vinylidene chloride containing polymerization inhibiting amounts of a phenol which consists essentially in mixing with such monomer a compound from the class consisting of acetic anhydride and acetyl chloride, in amount at least equivalent to the phenol present, and a relatively much smaller amount of sulfuric acid, and subjecting the mixture to temperature conditions known to induce polymerization of the uninhibited monomer, keeping the said mixture anhydrous at least until polymerization has started.

5. The method of polymerizing monomeric vinylidene chloride containing polymerization inhibiting amounts of a phenol which consists essentially in mixing with such a monomer a compound from the class consisting of acetic anhydride and acetyl chloride, in amount at least equivalent to the phenol present, and a small amount, up to about 1 per cent of the weight of monomer, of a peroxide catalyst, and subjecting the mixture to temperature conditions known to induce polymerization of the uninhibited monomer, keeping the said mixture anhydrous at least until polymerization has started.

6. The mehod of polymerizing monomeric vinylidene chloride containing polymerization inhibiting amounts of a phenol which consists essentially in mixing with such monomer a compound from the class consisting of acetic anhydride and acetyl chloride, in amount at least equivalent to the phenol present, and relatively much smaller amounts of sulfuric acid and of benzoyl peroxide, and subjecting the mixture to temperature conditions known to induce polymerization of the uninhibited monomer, keeping the said mixture anhydrous at least until polymerization has started.

7. The method of polymerizing monomeric vinylidene chloride containing polymerization inhibiting amounts of a phenol which consists essentially in mixing with such monomer a compound from the class consisting of acetic anhydride and acetyl chloride, in amount at least equivalent to the phenol present, and subjecting the mixture to temperature conditions known to induce polymerization of the uninhibited monomer, keeping the said mixture anhydrous at least until polymerization has started, and thereafter dispersing the polymerizing mixture in water and completing the polymerization in such dispersion.

THEODORE W. SARGE.

REFERENCES CITED

The following references are of record in the file of this patent:

Staudinger: British Plastics, pages 381–385, September 1947.

Lucas: "Organic Chemistry," page 413, American Book Co. (1935).